United States Patent
Swessel et al.

(10) Patent No.: US 9,096,170 B2
(45) Date of Patent: Aug. 4, 2015

(54) LIGHT FIXTURES FOR DOORWAYS AND OTHER AREAS

(75) Inventors: Mark R. Swessel, Milwaukee, WI (US); Norbert Hahn, Franklin, WI (US); Tim Muhl, Slinger, WI (US); Mark G. Petri, Mequon, WI (US); Paul Maly, Mequon, WI (US); Charles S. Waugaman, Mequon, WI (US); Matthew C. McNeill, Whitefish Bay, WI (US); Paul D. Rowlett, Grafton, WI (US); Jason Dondlinger, Bellevue, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 44 days.

(21) Appl. No.: 12/568,499

(22) Filed: Sep. 28, 2009

(65) Prior Publication Data

US 2011/0075441 A1    Mar. 31, 2011

(51) Int. Cl.
*F21V 5/00* (2006.01)
*F21V 7/04* (2006.01)
*B60Q 1/00* (2006.01)
(Continued)

(52) U.S. Cl.
CPC *B60Q 3/06* (2013.01); *B60Q 3/004* (2013.01); *B60Q 3/005* (2013.01); *B65G 69/008* (2013.01); *F21S 8/033* (2013.01); *F21S 8/04* (2013.01); *F21V 17/005* (2013.01); *F21Y 2101/02* (2013.01); *F21Y 2103/00* (2013.01); *F21Y 2103/003* (2013.01); *F21Y 2113/005* (2013.01)

(58) Field of Classification Search
CPC ....... G02B 6/001; F21V 33/006; F21S 8/037; F21S 8/046; F21S 8/10

USPC .................. 362/554, 551, 576, 485, 459, 312
See application file for complete search history.

(56) References Cited

U.S. PATENT DOCUMENTS

| 4,182,532 A | 1/1980 | Walker, Sr. |
| 4,206,495 A * | 6/1980 | McCaslin ..................... 362/551 |

(Continued)

FOREIGN PATENT DOCUMENTS

| DE | 10259623 | 7/2004 |
| EP | 2572935 A2 | 3/2013 |

(Continued)

OTHER PUBLICATIONS

Pdf webpage: http://web.archive.org/web/20070829182145/http://www.lrc.rpi.edu/programs/Futures/LF-Hannover97/index.asp, dated Aug. 29, 2007.*

(Continued)

*Primary Examiner* — Robert May
*Assistant Examiner* — Bryon T Gyllstrom
(74) *Attorney, Agent, or Firm* — Hanley, Flight & Zimmerman, LLC

(57) ABSTRACT

Example light fixtures include one or more light transmitting illuminated rods that emit a series or array of discrete spots of light. Some example light fixtures disclosed herein include optical features that provide an intriguing, attention-getting affect that can be useful particularly in alerting personnel of certain conditions at a doorway of a truck loading dock. In some examples, the light transmitting rods are mechanically coupled to a housing that contains an LED light source. The mechanical coupling allows the illuminated rods to be readily replaced without disrupting with the operation or wiring of the light source. Some example light fixtures illuminate the cargo bay of a vehicle at the loading dock.

17 Claims, 13 Drawing Sheets

(51) Int. Cl.

| | |
|---|---|
| B60Q 3/00 | (2006.01) |
| F21L 19/00 | (2006.01) |
| B60Q 3/06 | (2006.01) |
| B65G 69/00 | (2006.01) |
| F21S 8/00 | (2006.01) |
| F21S 8/04 | (2006.01) |
| F21V 17/00 | (2006.01) |
| F21Y 101/02 | (2006.01) |
| F21Y 103/00 | (2006.01) |
| F21Y 113/00 | (2006.01) |

(56) References Cited

U.S. PATENT DOCUMENTS

| | | | | |
|---|---|---|---|---|
| 4,585,298 | A | * | 4/1986 | Mori .............................. 385/31 |
| 5,097,395 | A | * | 3/1992 | Aho et al. ..................... 362/551 |
| 5,432,876 | A | | 7/1995 | Appeldorn et al. |
| 5,483,427 | A | | 1/1996 | Dealey, Jr. et al. |
| 5,573,327 | A | * | 11/1996 | Dealey et al. ................. 362/485 |
| 5,659,643 | A | * | 8/1997 | Appeldorn et al. ............. 385/31 |
| 5,709,458 | A | * | 1/1998 | Metz .............................. 362/96 |
| 5,722,758 | A | * | 3/1998 | Huang ........................ 362/548 |
| 5,845,038 | A | * | 12/1998 | Lundin et al. ................. 362/551 |
| 6,367,941 | B2 | | 4/2002 | Lea et al. |
| 6,431,717 | B1 | * | 8/2002 | Anderson et al. ............. 362/600 |
| 6,474,858 | B1 | * | 11/2002 | Liao .............................. 362/551 |
| 6,502,956 | B1 | | 1/2003 | Wu |
| 6,577,794 | B1 | * | 6/2003 | Currie et al. ................. 385/101 |
| 6,799,880 | B2 | * | 10/2004 | Gozum et al. ................ 362/582 |
| 7,194,184 | B2 | | 3/2007 | Buelow, II et al. |
| 7,407,217 | B2 | | 8/2008 | Compaan |
| 7,549,783 | B2 | | 6/2009 | Cassarly et al. |
| 2002/0018350 | A1 | * | 2/2002 | Lepley et al. ................. 362/551 |
| 2002/0122637 | A1 | * | 9/2002 | Anderson et al. ............. 385/89 |
| 2003/0151912 | A1 | | 8/2003 | Ancel |
| 2003/0194189 | A1 | * | 10/2003 | Grothe et al. ................. 385/88 |
| 2004/0032747 | A1 | | 2/2004 | Currie et al. |
| 2004/0226228 | A1 | | 11/2004 | Digmann et al. |
| 2005/0231973 | A1 | * | 10/2005 | Cassarly et al. ............. 362/551 |
| 2005/0254249 | A1 | * | 11/2005 | Robbins ........................ 362/485 |
| 2006/0114684 | A1 | * | 6/2006 | Marquez ...................... 362/487 |
| 2007/0283636 | A1 | * | 12/2007 | Bernacki et al. ............. 52/173.2 |
| 2008/0127435 | A1 | | 6/2008 | Maly et al. |

FOREIGN PATENT DOCUMENTS

| | | |
|---|---|---|
| EP | 2572935 A3 | 3/2013 |
| EP | 2572934 A3 | 10/2013 |
| FR | 2220144 | 9/1974 |
| FR | 2886238 A1 | 12/2006 |
| JP | 2004332385 A | 11/2004 |
| WO | 9718105 | 5/1997 |
| WO | 9833008 | 7/1998 |
| WO | 0063613 A1 | 10/2000 |
| WO | 2005095848 | 10/2005 |

OTHER PUBLICATIONS

International Searching Authority, "Invitation to Pay Additional Fee's and Partial Search Report," issued in connection with international application serial No. PCT/US2010/049337, mailed Dec. 22, 2010, 9 pages.

International Searching Authority, "International Search Report," issued in connection with international application serial No. PCT/US2010/049337, mailed Mar. 16, 2011, 6 pages.

International Searching Authority, "Written Opinion of the International Searching Authority," issued in connection with international application serial no. PCT/US2010/049337, mailed Mar. 16, 2011, 14 pages.

Hecht, Jeff, "Understanding Fiber," 2nd. ed., Indianapolis, IN, Sams, 1993, reproduced by the Physics Fact Book, retrieved on Apr. 20, 2012, http://hypertextbook.com/facts/1997/LaurenBoyd.shtml., 1 page.

"Fiber Optics," The American Heritage® Dictionary of the English Language, Fourth Edition copyright © 2000 by Houghton Mifflin Company, updated in 2009, published by Houghton Mifflin Company, retrieved from the free dictionary by Farlex, www.freedictionary.com/fiber-optic, 1 page.

"Fibre Optics," Encyclopaedia Britannca, vol. IV., 1974, reproduced by the Physics Fact Book, retrieved on Apr. 20, 2012, http://hypertextbook.com/facts/1997/LaurenBoyd.shtml., 1 page.

International Bureau, "International Preliminary Report on Patentability," issued in connection with application serial No. PCT/US2010/049337, mailed Apr. 12, 2012, 15 pages.

Australian Patent Office, "Examination Report," issued in connection with Australian application serial No. 2010298499, issued Nov. 16, 2012, 4 pages.

European Patent Office, "Extended European Search Report," issued in connection with Application No. 12008213.6, Sep. 2, 2013, 6 pages.

European Patent Office, "Extended European Search Report," issued in connection with Application No. 12008212.8, Sep. 2, 2013, 7 pages.

European Patent Office, "Communication pursuant to Article 94(3) EPC," issued in connection with Application No. 10760842.4, Sep. 3, 2013, 7 pages.

Canadian Intellectual Property Office, "Office Action," issued in connection with Canadian Patent Application No. 2,774,370, dated Feb. 11, 2014, 2 pages.

IP Australia, "Patent Examination Report No. 2," issued in connection with Australian Patent Application No. 20100298499, on Dec. 9, 2013 (4 pages).

IP Australia, "Notice of Acceptance," issued in connection with Australian Patent Application No. 20100298499, on Aug. 5, 2014 (2 pages).

Canadian Intellectual Property Office, "Office Action," issued in connection with Canadian Patent Application No. 2,774,370, dated Feb. 20, 2015, 5 pages.

* cited by examiner

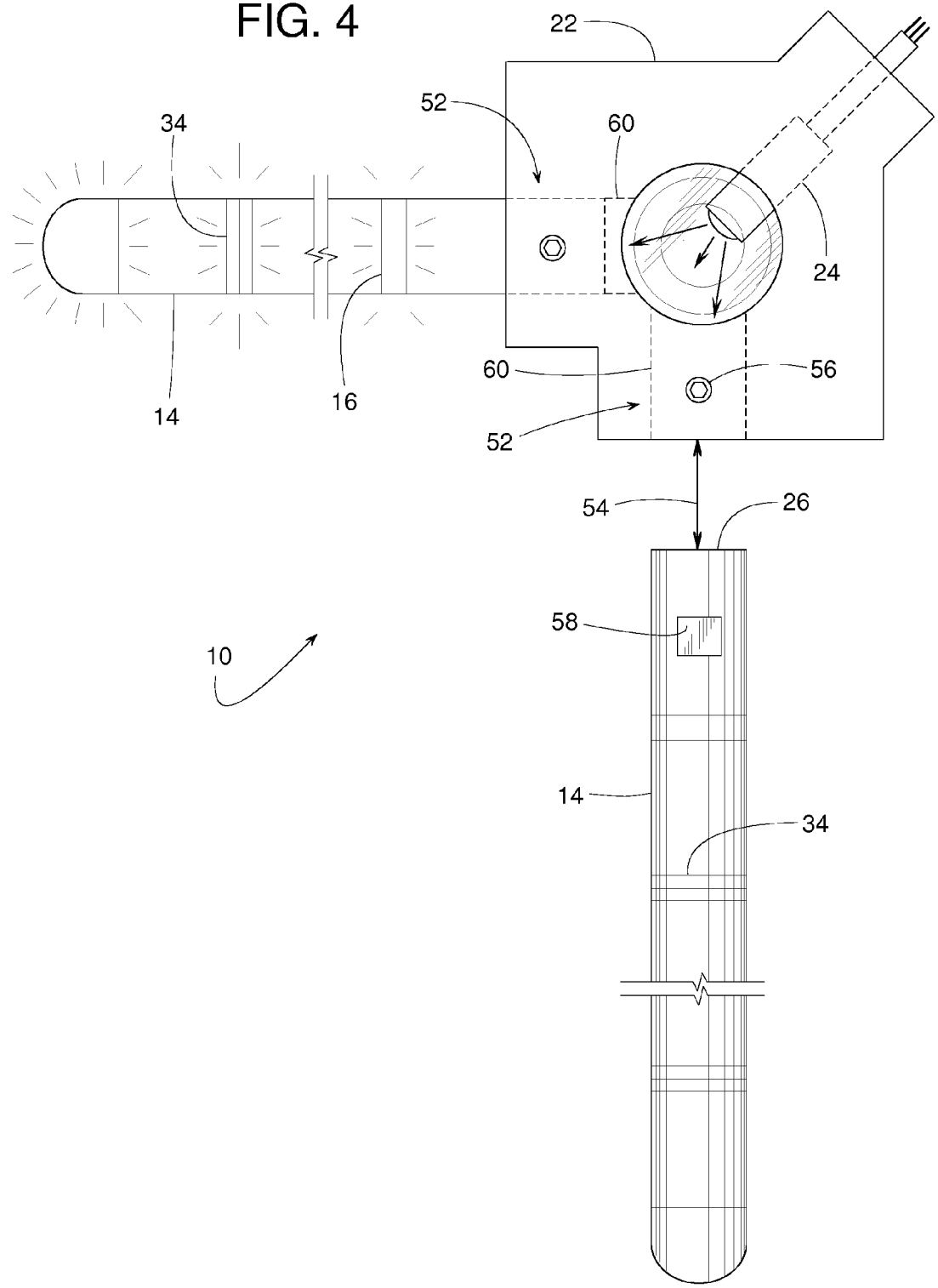

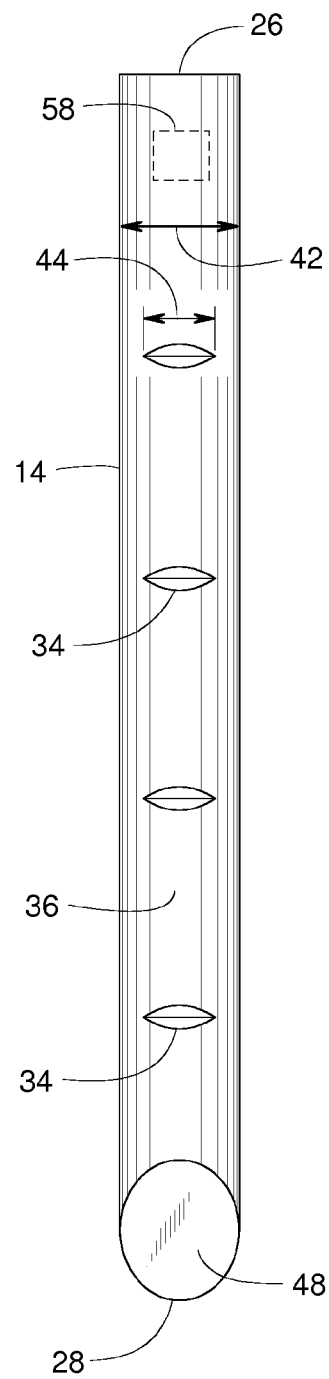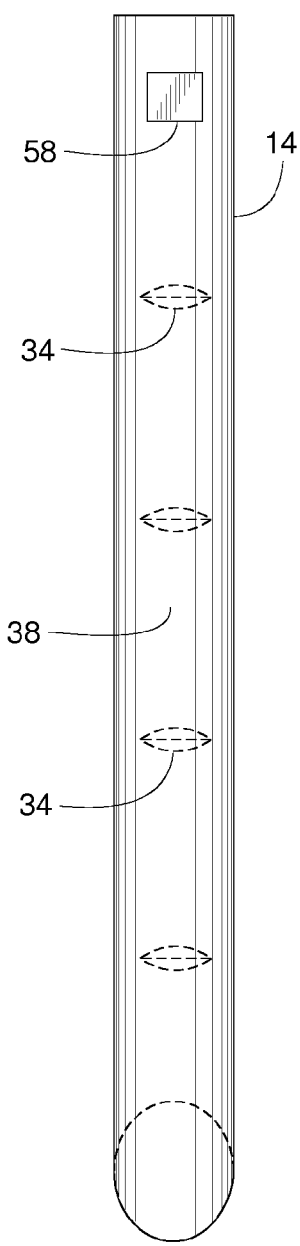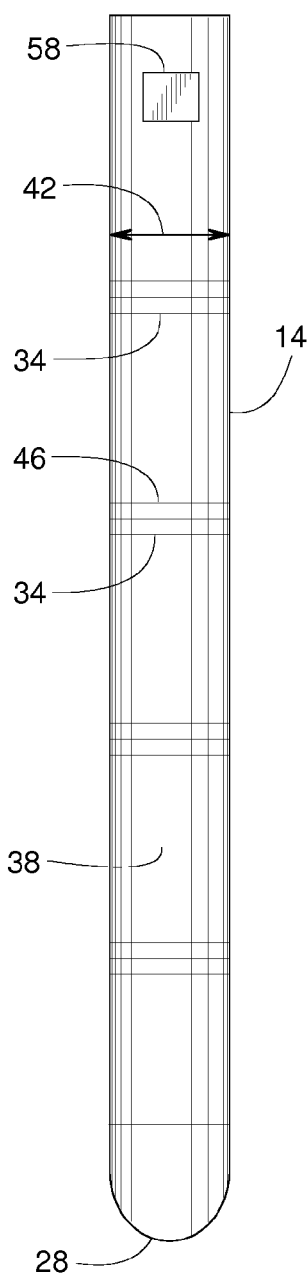

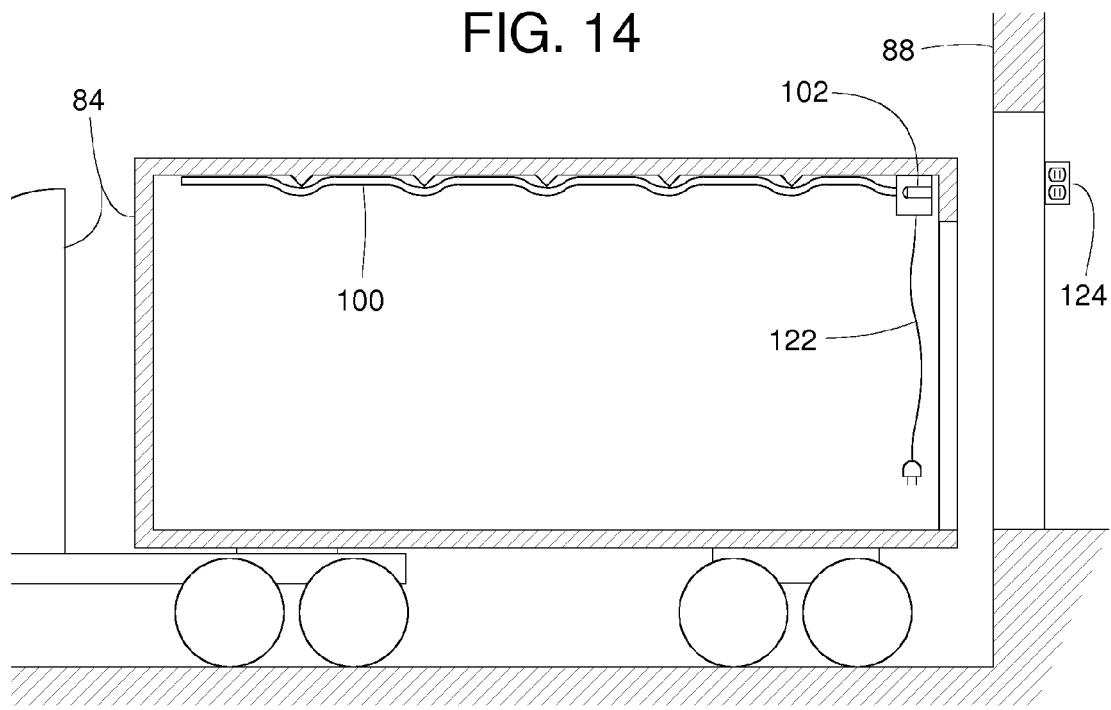
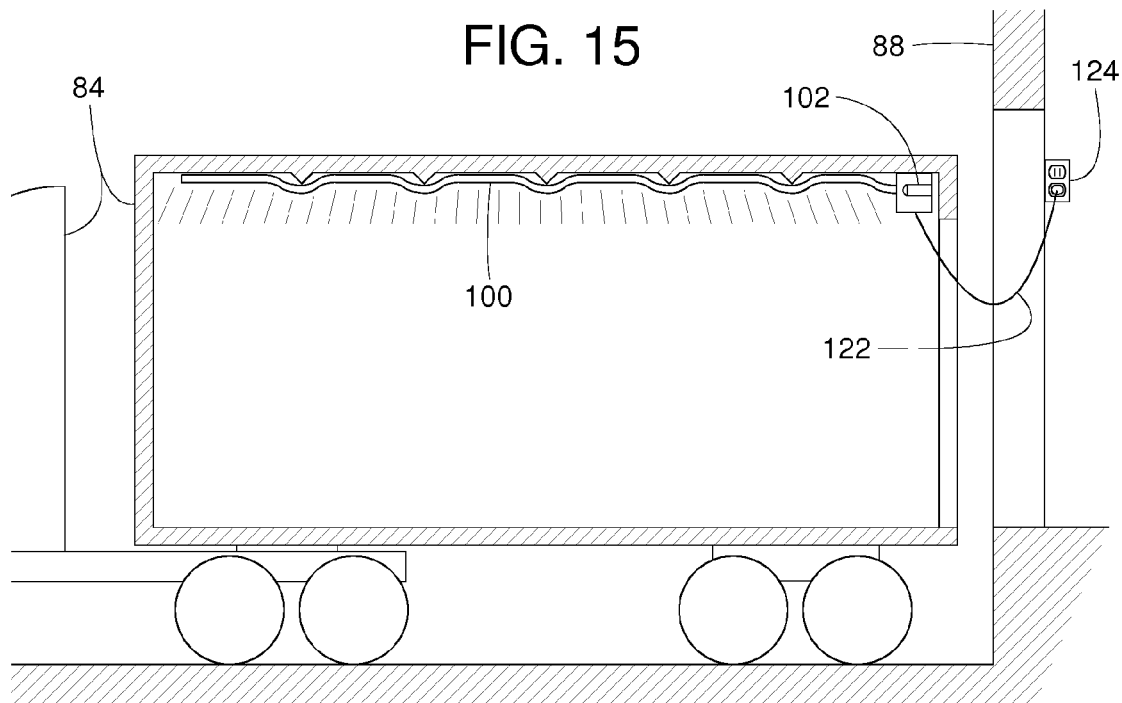

LIGHT FIXTURES FOR DOORWAYS AND OTHER AREAS

FIELD OF THE DISCLOSURE

This patent generally pertains to light fixtures and, more specifically, to light fixtures for use adjacent doorways and other areas.

BACKGROUND

A variety of light fixtures have been developed to provide various patterns of light. For example, so-called "rope lights" comprise a series of LEDs (light emitting diodes) encased within a flexible plastic tube that can be configured in various shapes. Optical fibers have also been used for transmitting and/or emitting light along, for example, a curved path. Neon lights are yet another example of a light fixture for creating certain desired light patterns. Although rope lights, optical fibers and neon lights are useful in certain applications, they do have their limitations.

BRIEF DESCRIPTION OF THE DRAWINGS

FIG. 4 is a front view similar to FIG. 2 but showing the light fixture being reconfigured.

FIG. 5 is a back view of an example rod that can be used to implement an example light fixture described herein.

FIG. 6 is a front view of the example rod of FIG. 5.

FIG. 7 is a front view similar to FIG. 6 but showing certain features distorted by the optical characteristics of the example rod material and shape.

FIG. 14 is a cross-sectional side view similar to FIG. 11 but showing yet another example electrical power source for powering the example light fixture of FIG. 11.

FIG. 15 is a cross-sectional side view similar to FIG. 15 but showing the example electrical power source connected to the example light fixture of FIG. 14.

DETAILED DESCRIPTION

Figure 1:
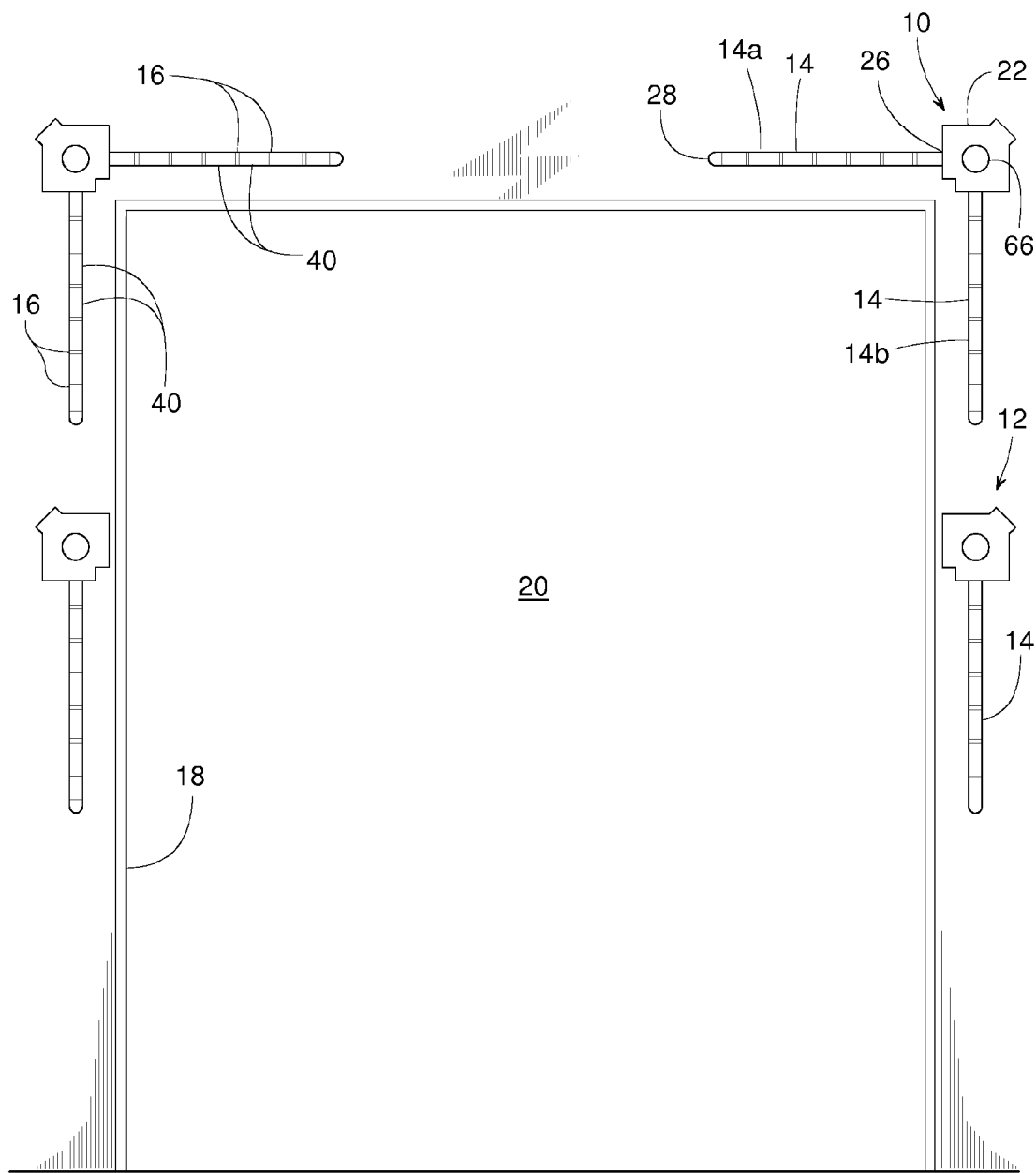
FIG. 1 is a front view of an example light fixture assembly described herein.
Figure 2:
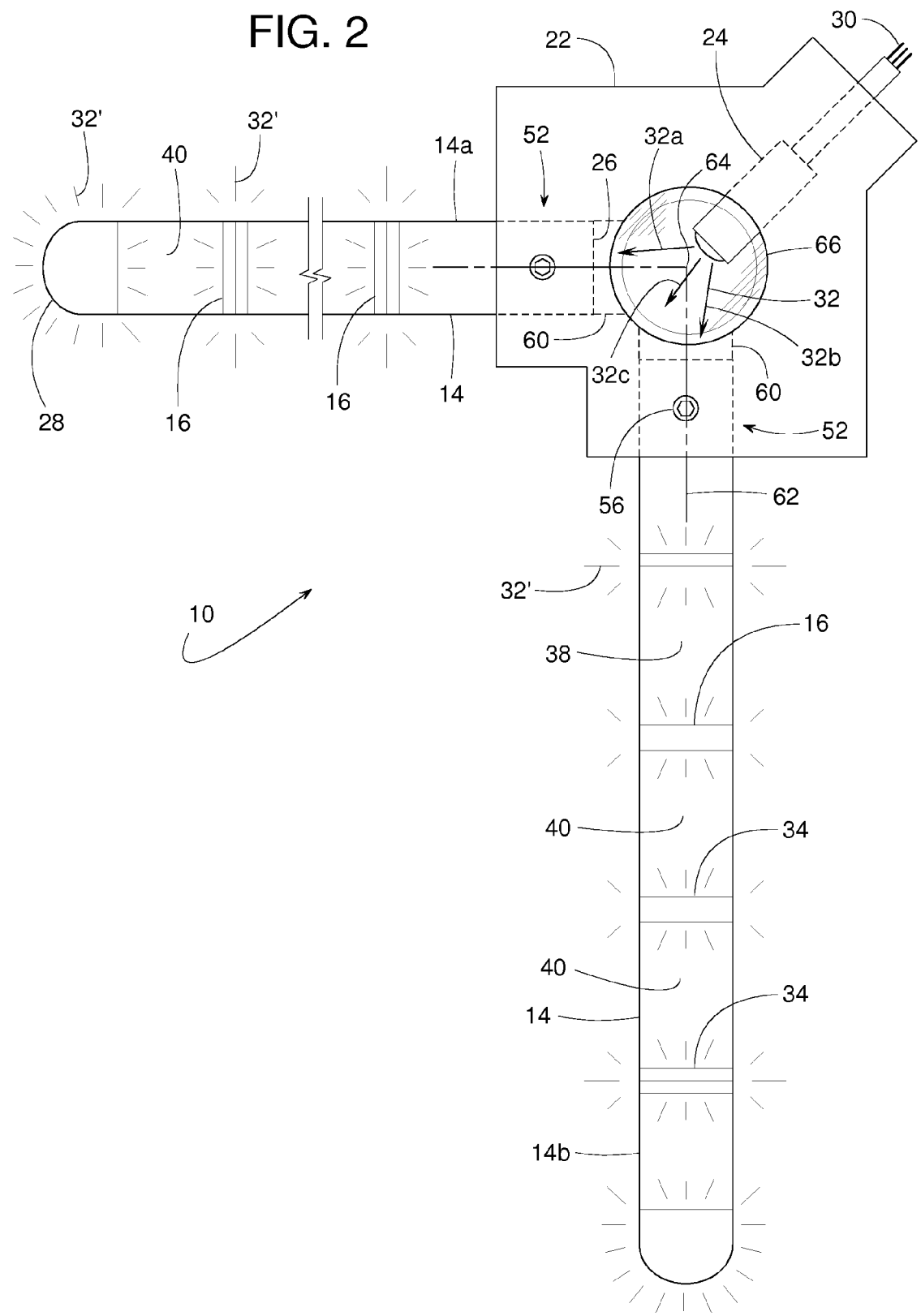
FIG. 2 is a front view of the example light fixture used in the assembly shown in FIG. 1.
Figure 3:
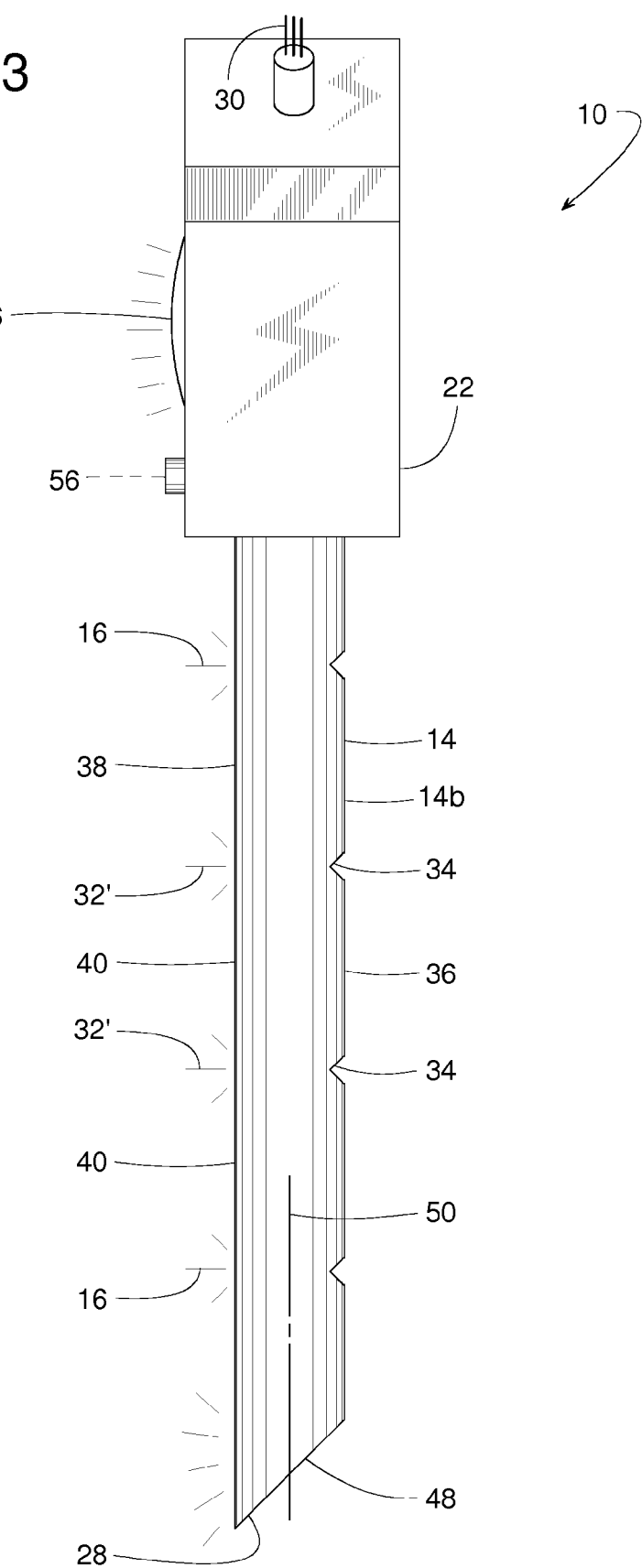
FIG. 3 is a side view of FIGS. 1 and 2.

In the examples shown in FIGS. 1-4, light fixtures 10 and 12 include one or more light emitting rods 14 each providing a plurality of discrete illuminations and/or images of light 16. Light fixtures 10 and 12 are substantially rigid and can be used in various applications. FIG. 1, for example, shows fixtures 10 and 12 installed along a frame 18 of a doorway 20 to highlight, illuminate and/or delineate the edges and/or corners of doorway 20. In the example of FIG. 1, doorway 20 is at a truck loading dock that is used for transferring cargo between a truck or trailer bed and an adjacent platform of a building.

In some examples, light fixtures 10 and 12 can be controlled to emit different colors of light (e.g., white, red, green, yellow, etc.) to indicate different operating conditions at the dock. A red light, for instance, could indicate that a truck or trailer is not safely secured at the dock or that a forklift on the truck or trailer bed is about to back into the building through doorway 20. A green light could indicate that a truck or trailer is secured to the dock and is ready for loading or unloading. Additionally or alternatively, some examples of light fixtures 10 and 12 could be controlled to flash on and off to indicate various other conditions at the dock.

Although the actual design of light fixtures 10 and 12 may vary, the illustrated example fixtures 10 and 12 include a housing 22, a light source 24 disposed within housing 22, and at least one example rod 14 of a transparent material attached to housing 22. Example rod 14 has a proximal end 26 attached to housing 22 and a distal end 28 pointing generally away from light source 24. The expression, "pointing away" simply means that distal end 28 is farther away from light source 24 than is proximal end 26.

In some examples, light source 24 is a dual selective color LED, e.g., part number 0130990 provided Alert Lighting Systems (ISE Plastics & Design) of Wind Lake, Wis. Such an example light source 24 can be configured (e.g., depending on how its electrical terminals 30 are wired to a power source) to emit light and/or light beams of different colors. Regardless of its color, a light beam 32 emitted from light source 24 passes generally lengthwise through rod 14. As light beam 32 travels from proximal end 26 to distal end 28, a plurality of notches 34 on a backside 36 of rod 14 deflects and/or disperses portions of beam 32. The terms, "notch" and "notches" mean any discontinuity in rod 14. In the illustrated example, notches 34 are V-shaped. However, in other examples, rod 14 has notches of other shapes including, but not limited to, square shapes, rectangular shapes, curved shapes, etc. The deflected light beam 32' corresponding to each notch 34 shines or illuminates through a front light-projecting side 38 of rod 14 to produce the plurality of discrete, spaced-apart illuminations or light images 16.

In some examples, notches 34 are spaced sufficiently apart from each other to create or provide a plurality of substantially non-illuminated or dark areas 40 between the discrete illuminations or light images 16. The expression, "substantially dark area" means a portion of rod 14 where light beam 32 can pass lengthwise through the rod 14 without a significant amount of light 32 being deflected out through the front light-projecting side 38 at the dark areas 40. For example, dark areas 40 ensure that the discrete illuminations or light images 16 are visually discernable (clearly spaced apart) when viewed from a distance (e.g., a distance of ten feet) away from rod 14. As a result, such a configuration provides an intriguing, attention-getting visual effect.

FIGS. 5-7 illustrate other examples in which the visual effect of the example light fixtures 10 and 12 is enhanced. For example, as shown in FIGS. 5-7, rod 14 of the example light fixtures 10 and 12 may be a solid round cylinder of a certain diameter or width 42 and having notches 34 being shorter (dimension 44) than the rod's width 42. FIG. 5 shows backside 36 of example rod 14, and FIG. 6 shows front light-projecting side 38. Although the dashed lines of notches 34 in FIG. 6 show the notches 34 to be relatively shorter than the full width 42 of rod 14, the curved outer surface of rod 14 magnifies or distorts the actual projected image emitted or illuminated via notches 34 so that notches 34 may appear to be approximate rectangles 46 that extend the full width 42 of rod 14, as shown in FIG. 7. When illuminated, the distorted images of notches 34 provide a glow of substantially rectangular illuminations of light, light spots or light images. A similar optical effect is provided in examples where distal end 28 of rod 14 includes a beveled surface 48 that lies at an incline relative to a longitudinal centerline 50 (FIG. 3) of rod 14. In some examples, beveled surface 48 transmits more or additional lumens of light than that of any of the individual notches 34 to provide an illuminated rod 14 having a visually prominent distal end 28.

In the illustrated example, rod 14 is solid and cylindrical member having a diameter of about one inch and an overall length of about 18 inches. However, in other examples, the rod 14 may have other cross-sectional shapes that include, but are not limited to, a square shape, a rectangular shape, a triangular shape, a tubular shape, etc. In this example, rod 14 is made of substantially clear acrylic. However, in other examples, rod 14 may be made of other materials including, but not limited to, polycarbonate and polystyrene. In the illustrated example, rod 14 is sufficiently rigid and is to be supported by housing 22 in a cantilevered manner to avoid having to provide rod 14 with an additional supporting structure. In other examples, rod 14 may have different degrees of transparency. In yet other examples rod 14 may have certain areas that are clear with other areas that are translucent or opaque. In some examples, rod 14 may be tinted.

In the illustrated example, a mechanical coupling 52 removably connects rod 14 to housing 22 such that rod 14 can be manually removed and/or replaced without having to interrupt the operation of light source 24. Arrow 54 of FIG. 4 shows rod 14 being moved between an attached position (rod 14 attached to housing 22) and a detached or removed position (e.g., rod 14 being separated from housing 22). In some examples, mechanical coupling 52 comprises a socket head screw 56 that screws into a threaded hole in housing 22 to clamp against a flat spot 58 on rod 14 when rod 14 is inserted in a socket 60 of housing 22. Flat spot 58 can help hold rod 14 in place and ensures that front light-projecting side 38 of rod 14 is orientated or positioned in the proper direction, so that the illuminated light provided by fixture 10 and/or 12 can be seen from a certain or desired angle relative to the mounting surface to which the light fixture 10 or 12 is to be mounted. In some examples, varying the circumferential location of flat spot 58 or omitting it entirely allows front light-projecting side 38 to be directed or aimed in any desired rotational direction relative to the mounting surface to which the light fixture 10 and/or 12 is to be mounted.

In this example, light fixture 10 includes two rods 14 (a first rod 14a and a second rod 14b) mounted to housing 22 and arranged in an L-shape 62 with a vertex 64 of the L-shape being in proximity with light source 24. In this example, light beam 32 from light source 24 diverges such that a first portion 32a of light beam 32 passes through first rod 14a, and a second portion 32b of light beam 32 passes through second rod 14b. In some examples, a third portion 32c of light beam 32 passes through a forward facing lens 66 in housing 22 to illuminate a corner point of light fixture 10. The term, "lens" means any light-transmitting element, e.g., transparent, translucent, curved, flat, and/or various combinations thereof.

In some examples, light fixture 10 can be configured similar to light fixture 12 by removing one rod 14 of light fixture 10. Upon removing rod 14, the resulting socket hole or void left in housing 22 can be plugged or left open.

Figure 8:
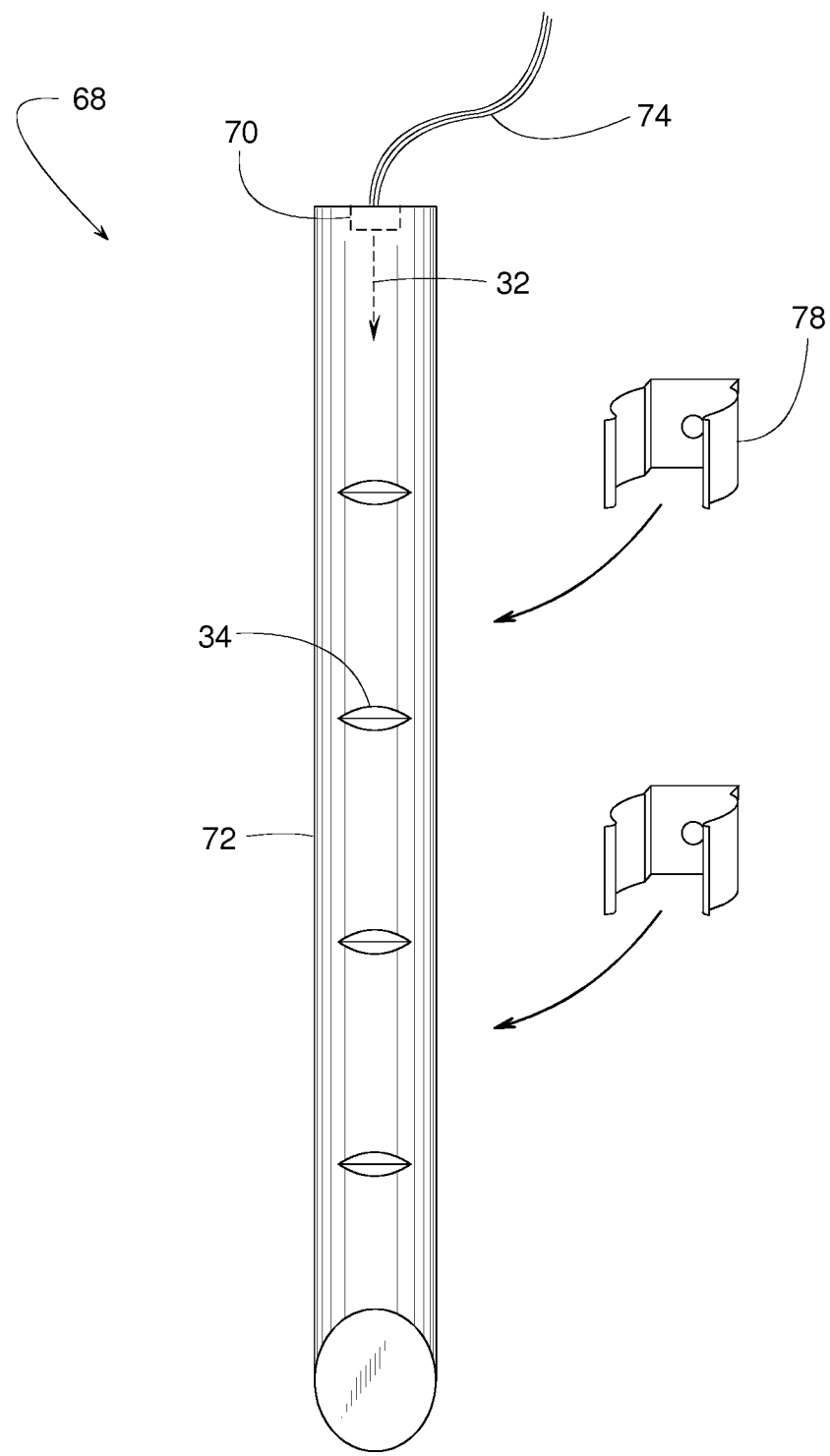
FIG. 8 is back view of another example light fixture with a perspective view of an example clip for holding the example light fixture in a desired position.
Figure 9:
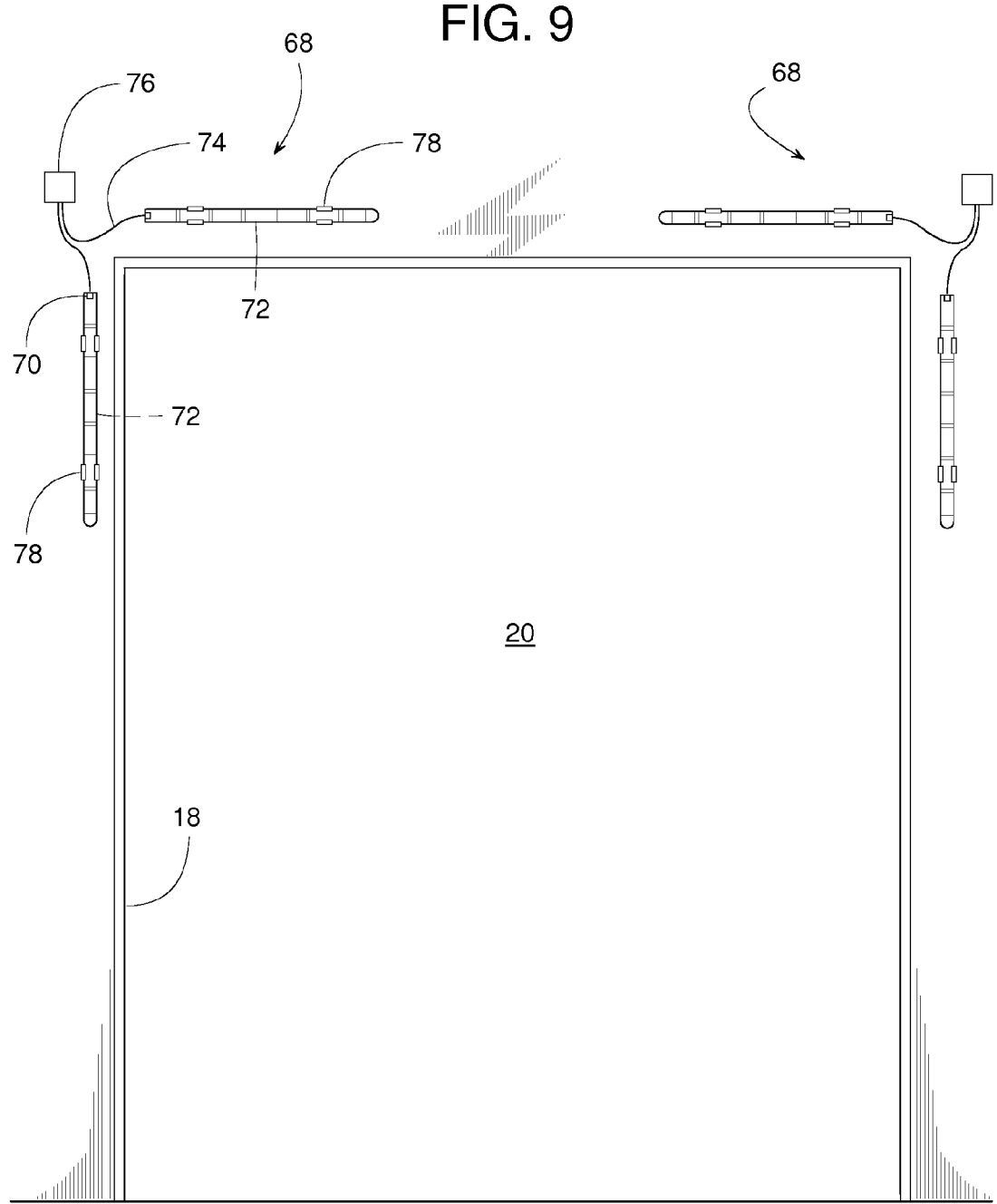
FIG. 9 is a front view of an example installation using the example light fixture of FIG. 8.

Additionally or alternatively, some examples of light fixtures 10 have light source 24 embedded or potted directly into proximal end 26 of rod 14. FIGS. 8 and 9, for instance, show an example light fixture 68 having a light source 70 (e.g., an LED emitting light beam 32) embedded into a rod 72. For example, rod 72 may include notches similar to notches 34 of rod 14. Such a configuration eliminates the need for housing 22. Without housing 22, wires 74 electrically couple light source 70 (e.g., directly) to a suitable power source 76. A snap-in clip 78 may be used to hold light fixture 68 in place. However, in other examples, a screw, a tack, a rivet, a chemical fastener, and/or any other suitable fastener(s) or mechanism(s) may be used to hold light fixture 68 in place.

Figure 10:
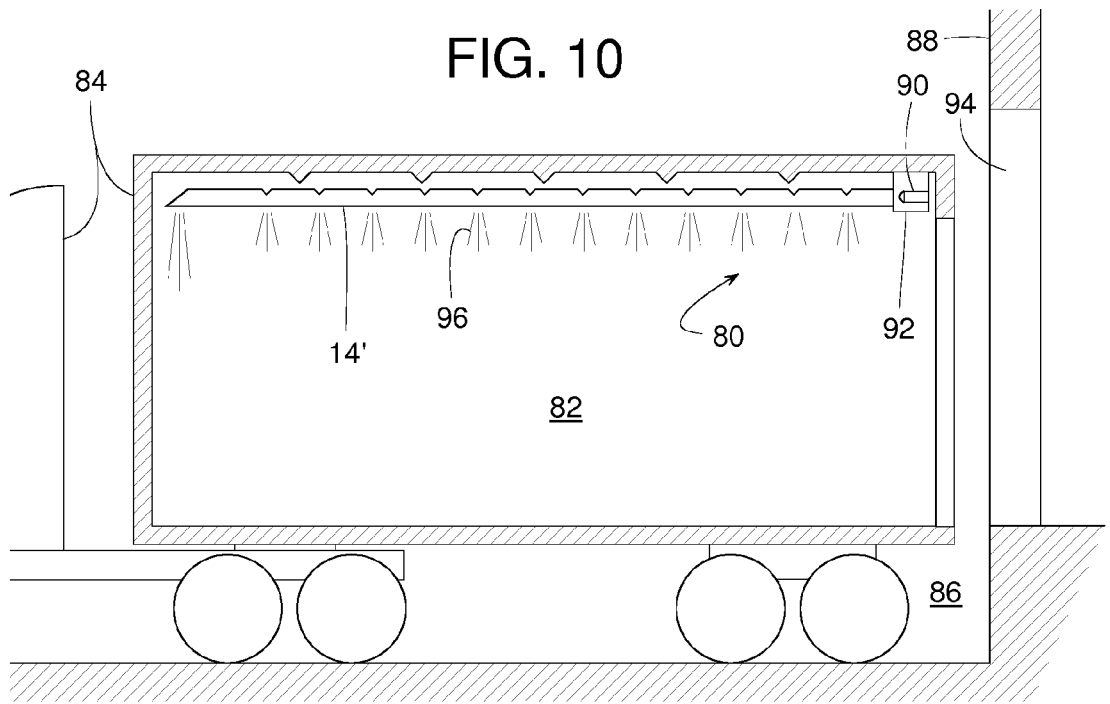
FIG. 10 is a cross-sectional side view of a vehicle having an example light fixture described herein installed within the vehicle's cargo bay.

FIG. 10 shows an example light fixture 80 mounted or installed within a cargo bay 82 of a vehicle 84, such as a truck or trailer. Vehicle 84 is shown parked at a loading dock 86 of a building 88. Light fixture 80 is similar to fixtures 10 and 12 in that light fixture 80 includes a generally linearly extending member for conveying and dispersing light in the form of a rod 14', a light source 90, and/or a housing 92 that are similar to rod 14, light source 24, and housing 22, respectively.

In this example, fixture 80 is particularly useful when vehicle 84 is backed up against a dock doorway 94 of building 88, wherein fixture 80 projects light 96 that illuminates substantially the full length of bay 82 while, for example, vehicle 84 is being loaded or unloaded of its cargo through doorway 94. Fixture 80 has a small profile to significantly reduce the overall footprint or the dimensional envelope of the light fixture 80. In this manner, the light fixture 80 does not interfere with the loading/unloading operation (e.g., movement of cargo and/or material handling equipment within bay 82.)

Various mounting configurations of fixture 80 include, but are not limited to, fixture 80 being mounted near the ceiling of cargo bay 82 and extending substantially the full length of bay 82, fixture 80 being mounted at some intermediate height between the bay's floor and ceiling, two fixtures 80 being mounted at the bay's ceiling adjacent the cargo bay's two upper longitudinal edges, one fixture 80 with the light emitting rod 14' being formed and laid out to follow some shape or configuration within cargo bay 82, and/or any other suitable configuration.

Figure 11:
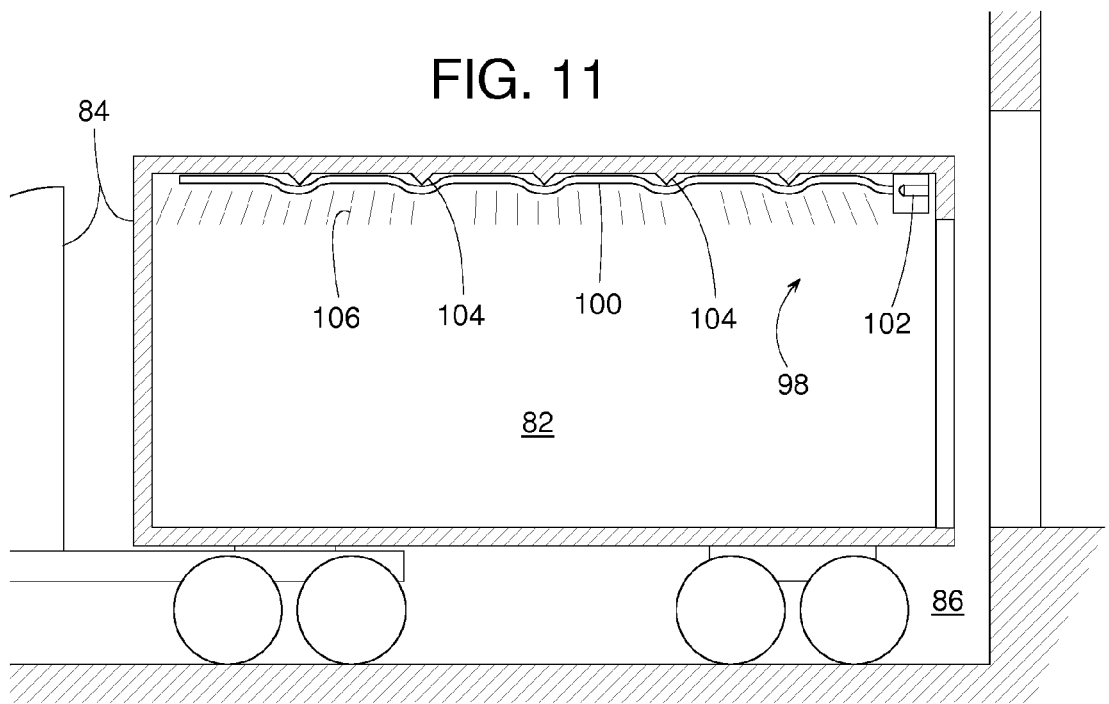
FIG. 11 is a cross-sectional side view of a vehicle with another example light fixture described herein installed within the vehicle's cargo bay.

The light fixture 98 of FIG. 11 represents various other types of light fixtures described herein that may be installed in vehicle 84. In this example, the light fixture 98 includes some components (e.g., lights) provided by Energy Focus, Inc., of Solon, Ohio. The example light fixture 98 of FIG. 11 includes a flexible generally linearly extending member for conveying and dispersing light, in the form of a flexible light transmitting rod 100. Light transmitting rod 100 is to be illuminated by a light source 102. The flexibility of rod 100 facilitates installation of the light fixture 98 around obstacles or protrusions 104 in vehicle 84.

In some examples, flexible rod 100 is a side-emitting fiber optic cable, such as, for example, a BRITEPAK III® stranded cable, wherein BRITEPAK is a registered trademark of Energy Focus, Inc. In some examples of light fixture 98, light source 102 is what Energy Focus, Inc. refers to as their "Fiberstars' LED e-Luminator," which can selectively provide various colors of light 106. Being able to change the color of light 106 can provide a means for signaling various conditions at loading dock 86. Red light, for instance, could alert a forklift driver of an unsafe condition in which it may be unsafe to enter or exit cargo bay 82 of vehicle 84. For example, the unsafe condition might indicate a potential collision with a nearby pedestrian or that a dock leveler lip or vehicle restraint disengaged vehicle 84.

In other examples, light source 102 is a generally white light, such as, for example, Fiberstars' 405N Illuminator provided by Energy Focus, Inc. In yet other examples, a generally white light can be used and/or controlled to flash, dim or otherwise signal conditions at dock 86. Additionally or alternatively, flexible rod 100 may be configured in any other suitable shape such as, for example, an S-shaped configuration, a C-shaped configuration, etc.

Additionally, other forms of a generally linearly extending member for conveying and dispersing light could be used in the examples described herein. A light pipe may be employed, for example, in the form of a rigid or flexible core material of a first index of refraction, and a cladding of a second (typically lower) index of refraction to facilitate the propagation of light down the pipe, for example by total internal reflection. To allow light to be extracted from the pipe, light-scattering material (for example light-reflective or light-refractive particles) can be embedded in the core or cladding to facilitate extracting light radially out of the pipe (so called "side-light extraction"). The density of particles down the length of the pipe may be controlled to ensure uniform side-light output—for example, with a greater density of particles further from the light source. An example of such a light pipe can be found in U.S. Pat. No. 7,194,184. An alternative method of side-light extraction (e.g. as found in U.S. Pat. No. 7,549,783) uses a light pipe having a core with spaced light-extraction means painted or otherwise applied to the exterior surface of the core. These light-extraction means cover a circumferential arc of the light pipe and include light-scattering particles. Varying certain properties of the light-extraction means (their size, spacing from each other, light-particle density, etc.) allows the side-light extraction properties to be programmed as desired for a given lighting application.

Returning to FIG. 11, light source 102 and other light source examples can receive electrical power from various sources including, but not limited to, the battery or generator of vehicle 84, a solar panel mounted to either vehicle 84 or installed at some location at dock 86, a disconnectable or removable power cable extending between vehicle 84 and a nearby electrical outlet, an electrical inductive coupling, etc.

Figure 12:
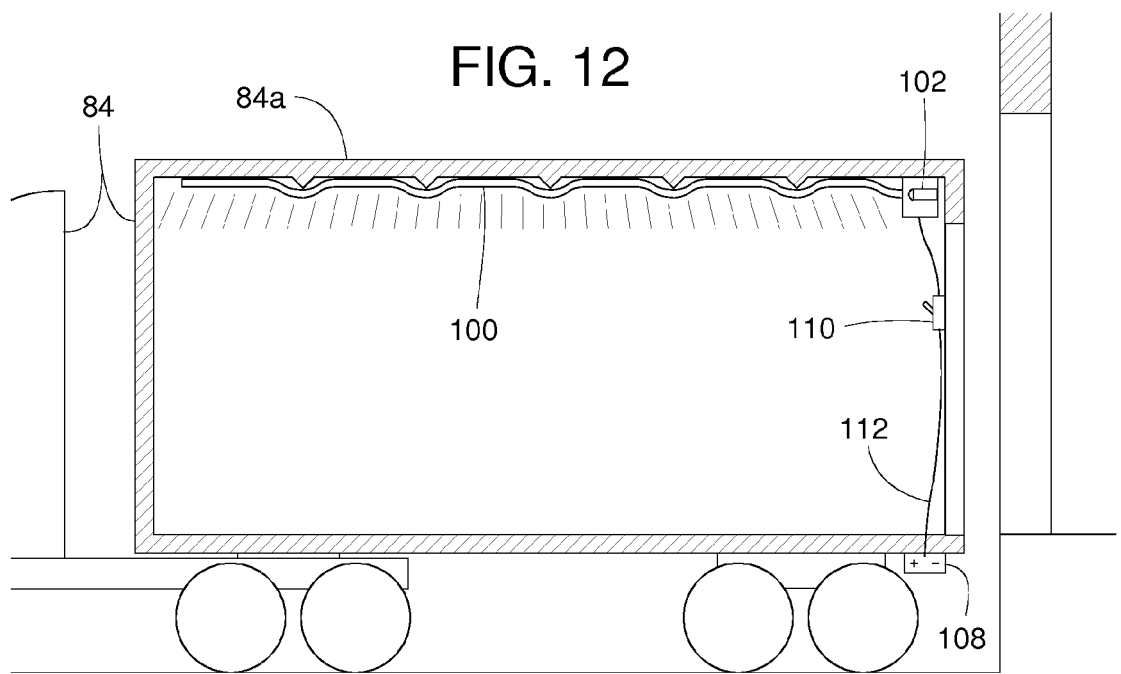
FIG. 12 is a cross-sectional side view similar to FIG. 11 but showing an example electrical power source for powering the light fixture.

FIG. 12, for instance, shows light source 102 being powered by a battery 108 mounted to a trailer 84a of vehicle 84. In this example, a control switch 110 in the wiring 112 that connects battery 108 to light source 102 controls the electrical power to light source 102. Control switch 110 is schematically illustrated to represent any device that can convey, control and/or interrupt the electrical power to light source 102. Examples of control switch 110 include, but are not limited to, a manually operated on/off switch; a timer; a proximity sensor (e.g., motion sensor, photoelectric eye, etc.) that can detect the presence or movement of forklift or person, etc.

Figure 13:
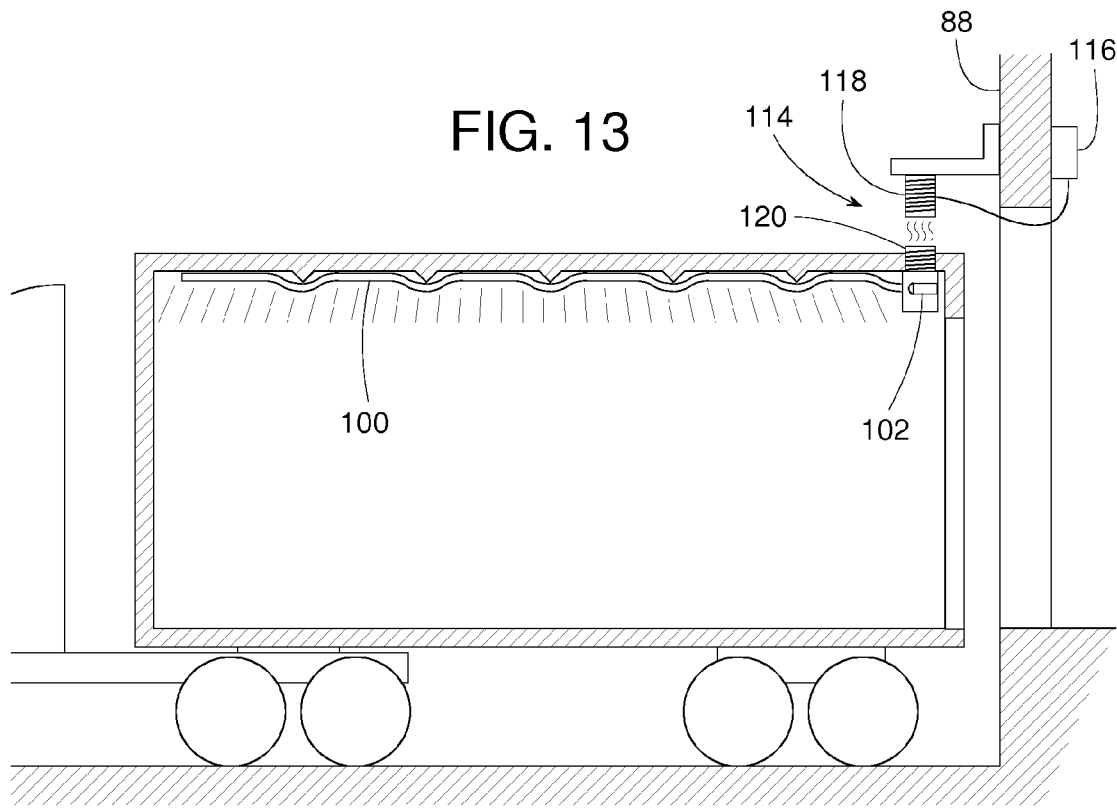
FIG. 13 is a cross-sectional side view similar to FIG. 11 but showing another example electrical power source for powering the example light fixture of FIG. 11.

FIG. 13 shows an example of an electrical inductive coupling 114 that conveys electrical power from an electrical supply 116 in building 88 to light source 102. Schematically illustrated coupling 114 includes a primary coil 118 and a secondary coil 120. When coils 118 and 120 are in proximity with each other, electrical current passing through primary coil 118 induces current to flow through secondary coil 120. The induced current in secondary coil 120 powers light source 102.

In the example of FIGS. 14 and 15, a disconnectable power cord 122 conveys electrical power from an electrical outlet 124 of building 88 to light source 102. FIG. 14 shows power cord 122 disconnected or unplugged from outlet 124 to de-energize light source 102, and FIG. 15 shows power cord 122 connected or plugged-in to energize light source 102. In similar examples, one end of power cord 122 is permanently wired to an electrical source of building 88, and the other end of power cord 122 selectively plugs into an electrical outlet or connector on vehicle 84, wherein the outlet or connector leads to light source 102.

Figure 16:
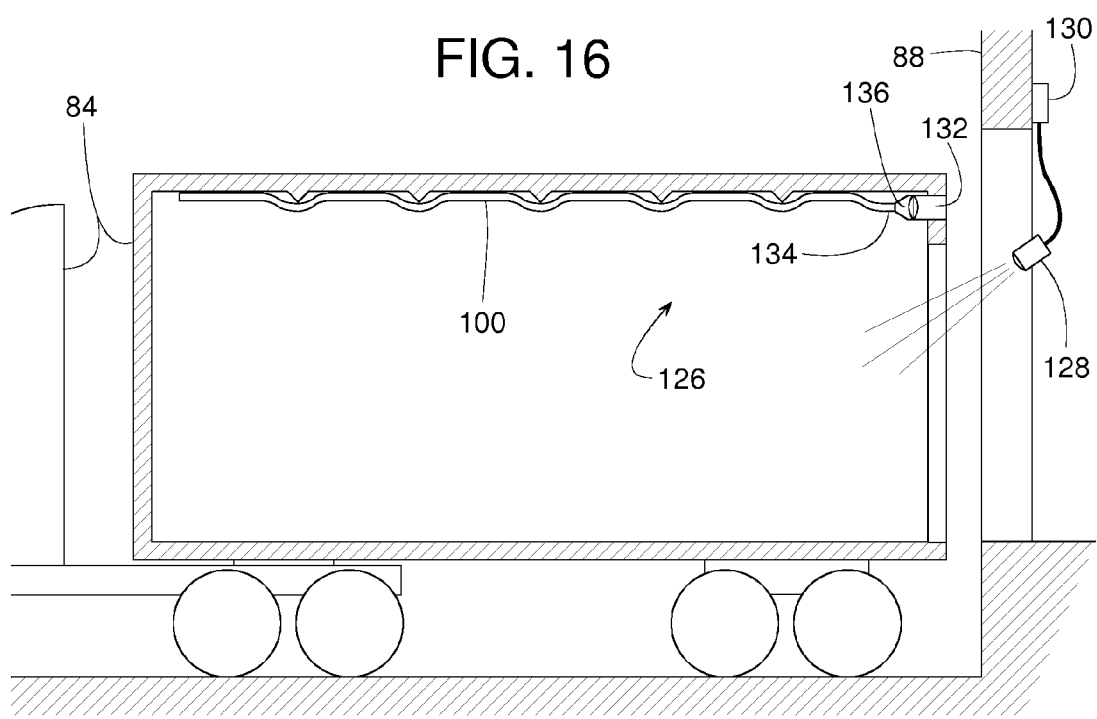
FIG. 16 is a cross-sectional side view of a vehicle with another example light fixture described herein installed within the vehicle's cargo bay.
Figure 17:
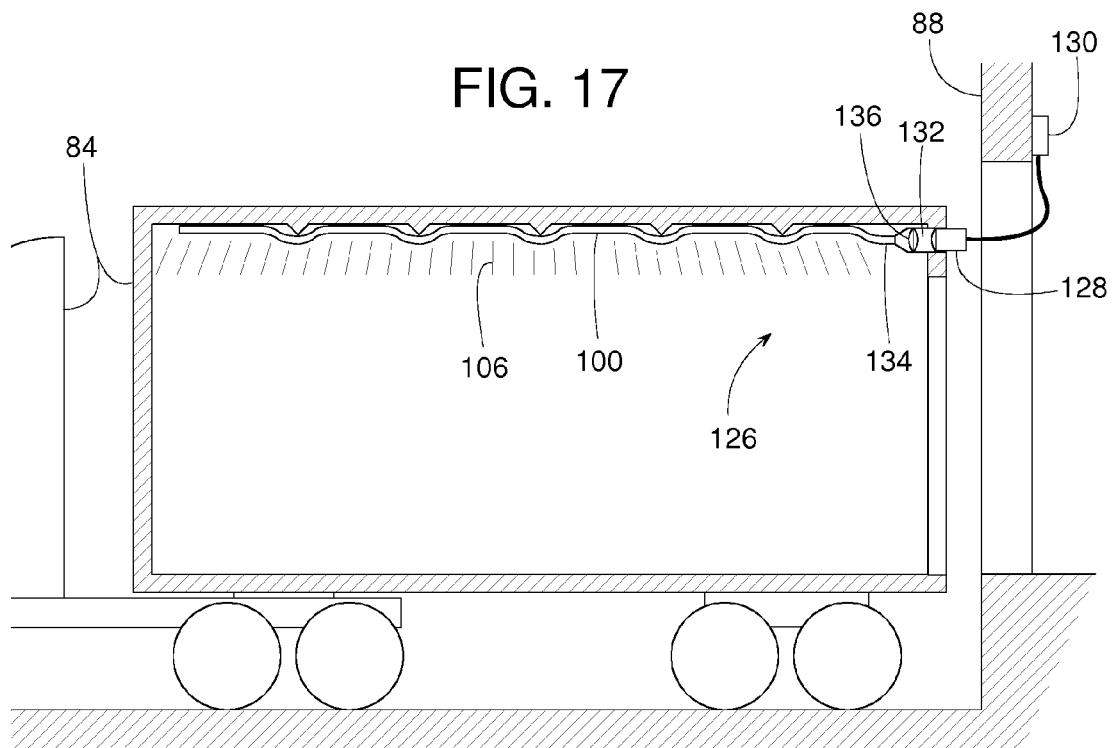
FIG. 17 is a cross-sectional side view similar to FIG. 16 but showing an example light source coupled to a light-emitting rod of the example light fixture of FIG. 16.

FIGS. 16 and 17 show another example light fixture 126 having light-emitting rod 100 and a separable light source 128. In this example, light source 128 is wired to an electrical box 130 in building 88. In this example, to project light through rod 100, light source 128 is selectively inserted into a socket 132 in vehicle 84 so that light from source 128 is directed toward a light-receiving end 134 of rod 100, as shown in FIG. 17. To discontinue the emission of light 106 from rod 100, light source 128 is disconnected from socket 132, as shown in FIG. 16. Other examples of light fixture 126 include different means for selectively connecting and disconnecting light source 128 from rod 100.

Still referring to FIGS. 16 and 17, in some examples, a lens 136 (or comparable light focusing device such as a reflector or a converging array of fiber optic cables) is disposed within socket 132 to focus or concentrate the light emitted from light source 128 more directly onto the light-receiving end 134 of rod 100. This allows light source 128 to be a general-purpose light (e.g., flood light or an array of LEDs) that projects a broader light beam, whereby light source 128 can then also be used for shining light directly into the cargo bay of trailers that do not have a light-emitting rod 100.

Figure 18:
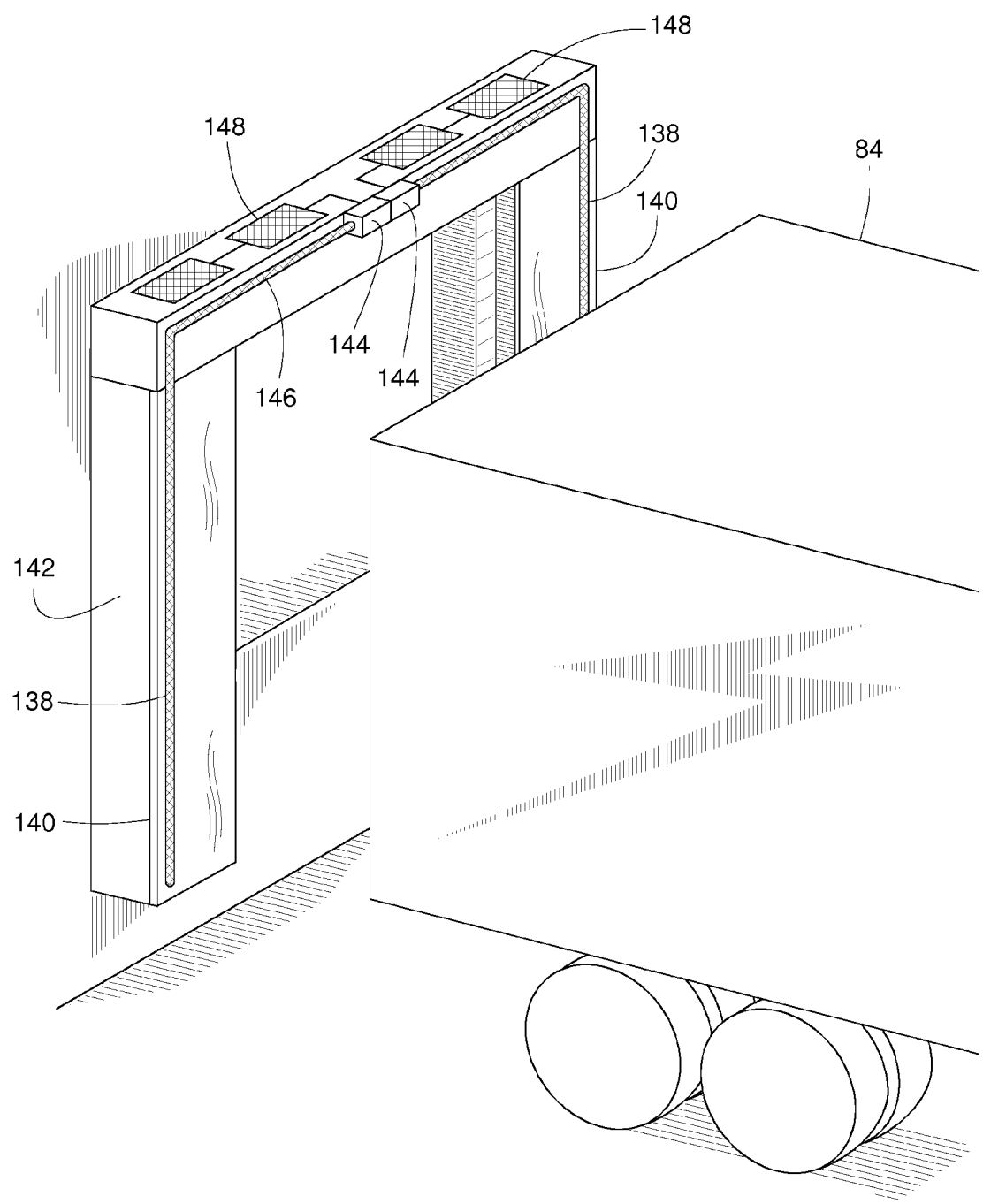
FIG. 18 is a perspective view of another example light fixture installed, for example, on a dock shelter.

In FIG. 18, at least one example light fixture 138 is shown disposed along a peripheral edge 140 of a dock shelter or dock seal 142 to help guide a driver in backing vehicle 84 into the loading dock area. In some examples, light fixture 138 includes a light source 144 projecting light or a light beam through a generally linearly extending member for conveying and dispersing light, in the form of a light-emitting rod 146. In some examples, a solar panel 148 provides electrical power to light source 144. However, in other examples, power may be provided to light fixture 138 via any other suitable means such as, for example, directly wiring light fixture 138 to a power source of a building. In some examples, the light fixture 138 is recessed relative to a surface of the dock seal such that the light fixture is substantially flush with an exterior surface of the dock seal.

Figure 19:
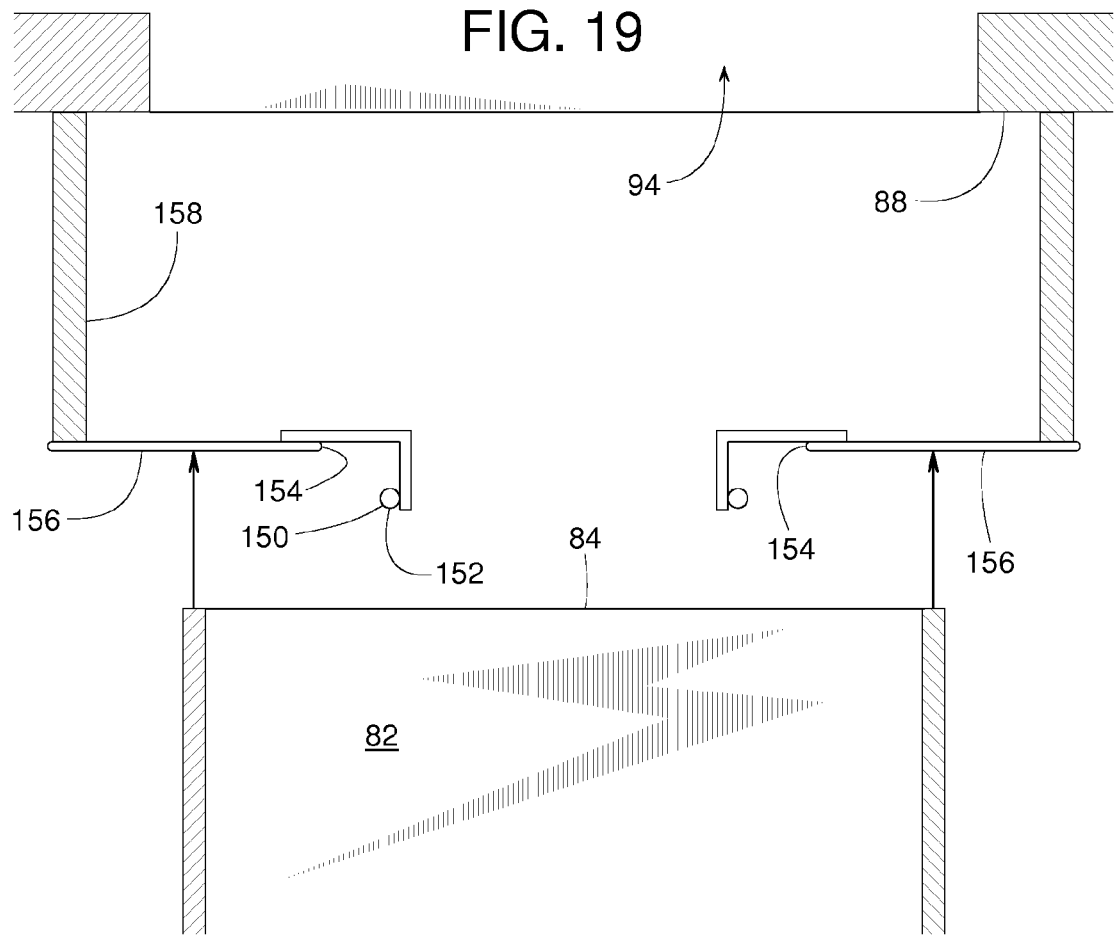
FIG. 19 is a cross-sectional top view of another example light fixture disposed along an inner lateral edge of a dock shelter.
Figure 20:
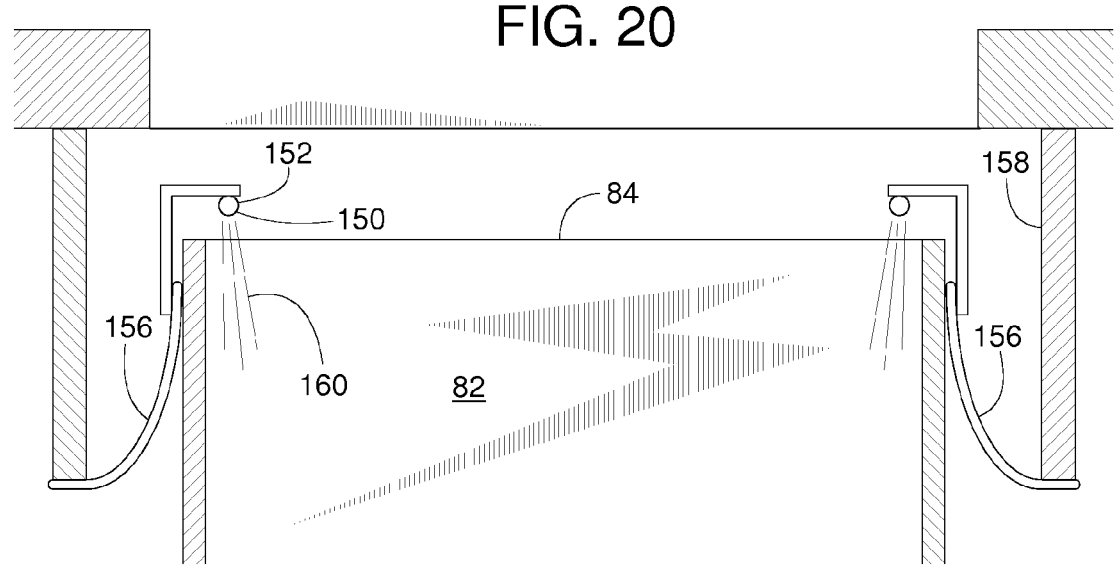
FIG. 20 is a cross-sectional view similar to FIG. 19 but showing the dock shelter's lateral shields deflected with the example light fixture configured or positioned to illuminate the vehicle's cargo bay.

FIGS. 19 and 20 show an example light fixture 150 having a generally linearly extending member for conveying and dispersing light, in the form of a light-emitting rod 152. As shown, light-emitting rod 152 is attached or coupled to the inner vertical edges 154 of a dock shelter's lateral shields 156. In some examples, rod 152 runs substantially the full vertical length of each edge 154. To illuminate rod 152, a suitable light source can be installed at either the upper or lower end of rod 152. As vehicle 84 backs into dock shelter 158, shields 156 deflect outward to seal against the sides of vehicle 84, as shown in FIG. 20. In some cases, the sides of vehicle 84 may be the vehicle's rear door panels that have been swung open around to the sides of vehicle 84. In some examples, shields 156 can also seal against the rear edges of vehicle 84. In any case, with shields 156 deflected, rods 152 become positioned or orientated to illuminate or emit light 160 into cargo bay 82 of vehicle 84. The rods of FIGS. 18-20 could also be replaced with side-emitting flexible fiber optic cable as in previous examples.

Some of the aforementioned examples may include one or more features and/or benefits including, but not limited to, the following:

Some example light fixtures provide an L-shaped light pattern for delineating a doorway.

Some example light fixtures provide a series of discrete spots of light that might appear as coming from multiple filaments when actually only one light source provides the plurality of light spots.

Some example light fixtures provide various optical effects that some viewers find intriguing and attention getting.

Some example light fixtures have illuminated rods that can be readily replaced without interrupting the electrical power to a light source of the fixture.

Some example light fixtures have a single LED light source that illuminates two rods and projects light through an additional lens.

Some example light fixtures employ a multi-color LED light source that is controlled to signal different conditions at a doorway of a truck loading dock.

Some example light fixtures illuminate the cargo bay of a vehicle at a loading dock.

Some example light fixtures are mounted to a dock shelter or dock seal to guide a driver in backing a vehicle into a dock and/or to illuminate the vehicle's cargo bay during loading and unloading operations.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A light fixture comprising:
    a housing to be coupled in a corner of a doorway;
    a rod coupled to the housing, the rod comprising a light transmitting material, the rod includes a proximal end, a distal end, a length extending between the proximal end and the distal end, a cavity in the proximal end, and a plurality of notches distributed along the length of the rod, the rod having an outer annular-shaped longitudinal surface that includes therein an integral flat portion recessed into the annular-shaped longitudinal surface and adjacent the proximal end of the rod to engage another portion of the housing to properly orient angularly the plurality of notches of the rod in only one direction relative to the housing when the rod is coupled to the housing, the rod having a self-supported distal end and is cantilevered from the housing to project along at least a portion of a horizontal perimeter of the doorway; and
    a light source disposed in the cavity of the proximal end of the rod to emit light through the length of the rod and toward the distal end of the rod, the plurality of notches to deflect light emitted through the rod to provide a corresponding plurality of light images that are separated by a plurality of darker areas along the length of the rod, the light images having a relatively greater intensity than an intensity of light provided by the darker areas of the rod such that the separated light images are visually discernable from each other due to the plurality of darker areas.

2. The light fixture of claim 1, wherein the rod is selectively movable between a removed position and an attached position with respect to the housing and the light source being able to emit light regardless of the position of the rod.

3. The light fixture of claim 1, wherein the rod is one of two similar rods attached to the housing with the two similar rods being configured in an L-shape.

4. A light fixture of claim 1, wherein the another portion of the housing comprises a flat portion, wherein the flat portion of the rod engages the flat portion of the housing to properly orient angularly the plurality of notches of the rod relative to the housing when the rod is coupled to the housing.

5. A light fixture of claim 1, wherein a socket head screw of the another portion of the housing is to clamp against the flat portion of the rod via a threaded aperture formed in the housing.

6. A light fixture of claim 1, wherein the rod has a front light-projecting side, a backside opposite the front light-projecting side, and a width perpendicular to the length, wherein the plurality of notches are distributed on the backside of the rod and along the length of the rod with each notch from the plurality of notches being shorter than the width of the rod.

7. The light fixture of claim 1, wherein the rod comprises:
    a first rod removably coupled to the housing to provide a first light path between the housing and a first distal end of the first rod, the first light path to illuminate at least a first perimeter portion of the doorway when the housing is coupled to a wall, and
    a second rod is removably coupled to the housing to provide a second light path between the housing and a second distal end of the second rod, the second light path to illuminate at least a second perimeter portion of the doorway when the housing is coupled to the wall.

8. The light fixture of claim 7, wherein a first longitudinal axis of the first rod and a second longitudinal axis of the second rod are substantially perpendicular to the housing when the first and second rods are coupled to the housing.

9. The light fixture of claim 8, wherein an angle between the first longitudinal axis of the first rod and the second longitudinal axis of the second rod is approximately ninety degrees.

10. A light fixture of claim 7, wherein each of the first and second rods are attached to the housing via a coupling member.

11. The light fixture of claim 1, further comprising a beveled surface at the distal end of the rod, the beveled surface lies at an incline relative to a longitudinal centerline of the rod, the beveled surface transmits more lumens of light from the light source than that of any notch of the plurality of notches.

12. The light fixture of claim 1, further comprising a mechanical coupling, wherein the mechanical coupling is to removably couple the rod to the housing such that the rod is selectively movable between a removed position and an attached position with respect to the housing.

13. The light fixture of claim 1, wherein the housing is positioned adjacent a perimeter of the doorway of a loading dock.

14. The light fixture of claim 1, wherein the housing is fixed along a side edge of an inner surface of a trailer.

15. The light fixture of claim 1, wherein a longitudinal axis of the rod passing through the distal end is substantially perpendicular to an axis of a second opening when the rod is coupled to the housing.

16. The light fixture of claim 1, wherein a cross-sectional profile of the rod taken along a longitudinal axis of the rod is substantially straight when the rod is coupled to the housing.

17. The light fixture of claim 1, wherein the housing defines an upper surface, a lower surface and at least five side surfaces positioned between the upper and lower surfaces.

* * * * *